(12) United States Patent
Taylor et al.

(10) Patent No.: US 7,730,144 B2
(45) Date of Patent: Jun. 1, 2010

(54) HIGH LEVEL NETWORK LAYER SYSTEM AND METHOD

(75) Inventors: Paulo Taylor, Amsterdam (NL); Jan-Joost Rueb, Amsterdam (NL); Onno Bakker, Amsterdam (NL)

(73) Assignee: eBuddy Holding B.V., Amsterdam (NL)

(*) Notice: Subject to any disclaimer, the term of this patent is extended or adjusted under 35 U.S.C. 154(b) by 616 days.

(21) Appl. No.: 11/637,954

(22) Filed: Dec. 11, 2006

(65) Prior Publication Data

US 2007/0168558 A1    Jul. 19, 2007

Related U.S. Application Data

(60) Provisional application No. 60/748,988, filed on Dec. 9, 2005.

(51) Int. Cl.
*G06F 15/16* (2006.01)
*G06F 12/00* (2006.01)

(52) U.S. Cl. .......................... 709/206; 709/207

(58) Field of Classification Search ............... 709/206, 709/207, 217, 218, 250, 223, 224, 229
See application file for complete search history.

(56) References Cited

U.S. PATENT DOCUMENTS

| | | |
|---|---|---|
| 6,415,318 B1 | 7/2002 | Aggarwal et al. |
| 6,484,196 B1 | 11/2002 | Maurille |
| 6,571,234 B1 | 5/2003 | Knight et al. |
| 7,389,324 B2 | 6/2008 | Masonis et al. |
| 7,426,382 B2 | 9/2008 | Aerrabotu et al. |
| 7,496,379 B2 | 2/2009 | Kaplan et al. |
| 7,523,138 B2 | 4/2009 | Gruhl et al. |
| 2002/0143916 A1 | 10/2002 | Mendiola et al. |
| 2003/0076367 A1 | 4/2003 | Bencze et al. |
| 2003/0210265 A1 | 11/2003 | Haimberg |

(Continued)

FOREIGN PATENT DOCUMENTS

WO    WO-9948011 A1    9/1999

(Continued)

OTHER PUBLICATIONS

International Search Report and Written Opinion for PCT application PCT/IB2006/004204 Search Report dated Jan. 8, 2008.

(Continued)

*Primary Examiner*—Zarni Maung
(74) *Attorney, Agent, or Firm*—Perkins Coie LLP

(57) ABSTRACT

A technique for providing high level network layer functionality to an IM environment involves providing a high level platform through which IM clients can connect to IM networks. A platform according to the technique may include a low level network connect engine, an aggregated low level information database, and/or a high level function engine. A method according to the technique may include facilitating a high level login; checking user configurations; accomplishing one or more IM network logins in accordance with the user configurations; and providing high level services in association with at least one of the IM networks. Another method according to the technique may include logging into a high level platform; logging into a first IM network; logging into a second IM network; and accessing at the high level platform aggregated low level information associated with the first IM network and the second IM network.

20 Claims, 6 Drawing Sheets

U.S. PATENT DOCUMENTS

| | | |
|---|---|---|
| 2003/0222907 A1 | 12/2003 | Heikes et al. |
| 2004/0010808 A1 | 1/2004 | deCarmo |
| 2004/0054646 A1 | 3/2004 | Daniell et al. |
| 2004/0054802 A1* | 3/2004 | Beauchamp et al. ......... 709/238 |
| 2004/0158609 A1* | 8/2004 | Daniell et al. ............... 709/206 |
| 2004/0158610 A1 | 8/2004 | Davis et al. |
| 2005/0080867 A1 | 4/2005 | Malik et al. |
| 2005/0097061 A1 | 5/2005 | Shapiro et al. |
| 2005/0114454 A1* | 5/2005 | D'Angelo et al. ........... 709/206 |
| 2005/0187781 A1* | 8/2005 | Christensen .................... 705/1 |
| 2005/0259656 A1* | 11/2005 | Dollar et al. ................. 370/392 |
| 2005/0268237 A1 | 12/2005 | Crane et al. |
| 2006/0168054 A1* | 7/2006 | Burkhart et al. ............. 709/206 |
| 2006/0256816 A1* | 11/2006 | Yarlagadda et al. ......... 370/466 |
| 2006/0265381 A1* | 11/2006 | Altaf et al. .................... 707/10 |
| 2006/0268828 A1* | 11/2006 | Yarlagadda .................. 370/352 |
| 2006/0271630 A1 | 11/2006 | Bensky et al. |
| 2006/0277053 A1* | 12/2006 | Lobb et al. ...................... 705/1 |
| 2007/0043878 A1* | 2/2007 | Carlson et al. ............... 709/246 |
| 2007/0135099 A1 | 6/2007 | Taylor et al. |
| 2007/0136419 A1 | 6/2007 | Taylor et al. |
| 2007/0168451 A1 | 7/2007 | Taylor et al. |
| 2007/0168529 A1 | 7/2007 | Taylor et al. |
| 2007/0192479 A1* | 8/2007 | Felten ......................... 709/224 |
| 2009/0125591 A1 | 5/2009 | Kirkpatrick |

FOREIGN PATENT DOCUMENTS

| | | |
|---|---|---|
| WO | WO-0120474 A1 | 3/2001 |
| WO | WO-0143357 A2 | 6/2001 |
| WO | WO-2004/031976 A1 | 4/2004 |
| WO | WO2005/074588 | 8/2005 |
| WO | WO-2006083820 A1 | 8/2006 |
| WO | WO-2007063041 A1 | 6/2007 |

OTHER PUBLICATIONS

International Search Report and Written Opinion for PCT application PCT/IB2006/004205 Search Report dated Jan. 8, 2008 10 pages.

International Search Report, PCT/IB2006/004264 (mailed Jun. 30, 2008) pp. 1-3.

International Search Report, PCT/IB2006/004193 (mailed Jun. 24, 2008) pp. 1-3.

International Search Report, PCT/IB2006/004200, (mailed Oct. 23, 2007) pp. 1-2.

Office Action mailed on Sep. 3, 2009 in co-pending U.S. Appl. No. 11/637,964, filed Dec. 11, 2006.

Office Actions mailed on Nov. 5, 2009 and May 18, 2009 in co-pending U.S. Appl. No. 11/637,316, filed Dec. 11, 2006.

Office Actions mailed on Dec. 30, 2009 and Jun. 25, 2009 in co-pending U.S. Appl. No. 11/637,514, filed Dec. 11, 2006.

Co-pending U.S. Appl. No. 11/637,268, filed Dec. 11, 2006.

* cited by examiner

HIGH LEVEL NETWORK LAYER SYSTEM AND METHOD

CROSS-REFERENCE TO RELATED APPLICATIONS

This Patent Application claims priority to U.S. Provisional Patent App. No. 60/748,988, filed Dec. 9, 2005, which is incorporated herein by reference. This Patent Application is related to U.S. Pat. application Ser. Nos. 11/637,268, 11/637,964, 11/637,514, 11/637,316, to Taylor, et al., respectively entitled PICTURE PROVISIONING SYSTEM AND METHOD, MESSAGE HISTORY DISPLAY SYSTEM AND METHOD, EVENT NOTIFICATION SYSTEM AND METHOD, and CONTACT LIST DISPLAY SYSTEM AND METHOD, filed concurrently herewith and incorporated by reference herein.

BACKGROUND

Instant messaging requires the use of a client program that hooks up an instant messaging service and differs from e-mail in that conversations are then able to happen in real time. Most services offer a presence information feature, indicating whether people on one's list of contacts are currently online and available to chat. This may be called a contact list. In early instant messaging programs, each letter appeared as it was typed, and when letters were deleted to correct typos this was also seen in real time. This made it more like a telephone conversation than exchanging letters. In modern instant messaging programs, the other party in the conversation generally only sees each line of text right after a new line is started. Most instant messaging applications also include the ability to set a status message, roughly analogous to the message on a telephone answering machine.

Popular instant messaging services on the public Internet include. NET Messenger Service, MSN Messenger, AOL Instant Messenger, Excite/Pal, Gadu-Gadu, Google Talk, iChat, ICQ, Jabber, Qnext, QQ, Meetro, Skype, Trillian and Yahoo! Messenger. These services owe many ideas to an older (and still popular) online chat medium known as Internet Relay Chat (IRC).

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for providing high level network layer functionality to an instant message (IM) environment involves providing a high level platform through which IM clients can connect to IM networks. A platform according to the technique may include a low level network connect engine for coupling a low level client to a low level server, such as a server of an IM network. The platform may further include an aggregated low level information database that includes data associated with, for example, the low level client, the low level server, the IM network, and/or other low level clients.

The platform may further include a high level function engine for, for example, providing functionality to the low level client not normally available to low level clients of the low level server, and for, for example, making information from the aggregated low level information database at least available online.

A method according to the technique may include facilitating a high level login; checking user configurations; accomplishing one or more IM network logins in accordance with the user configurations; and providing high level services in association with at least one of the IM networks. Another method according to the technique may include logging into a high level platform; logging into a first IM network; logging into a second IM network; and accessing at the high level platform aggregated low level information associated with the first IM network and the second IM network.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
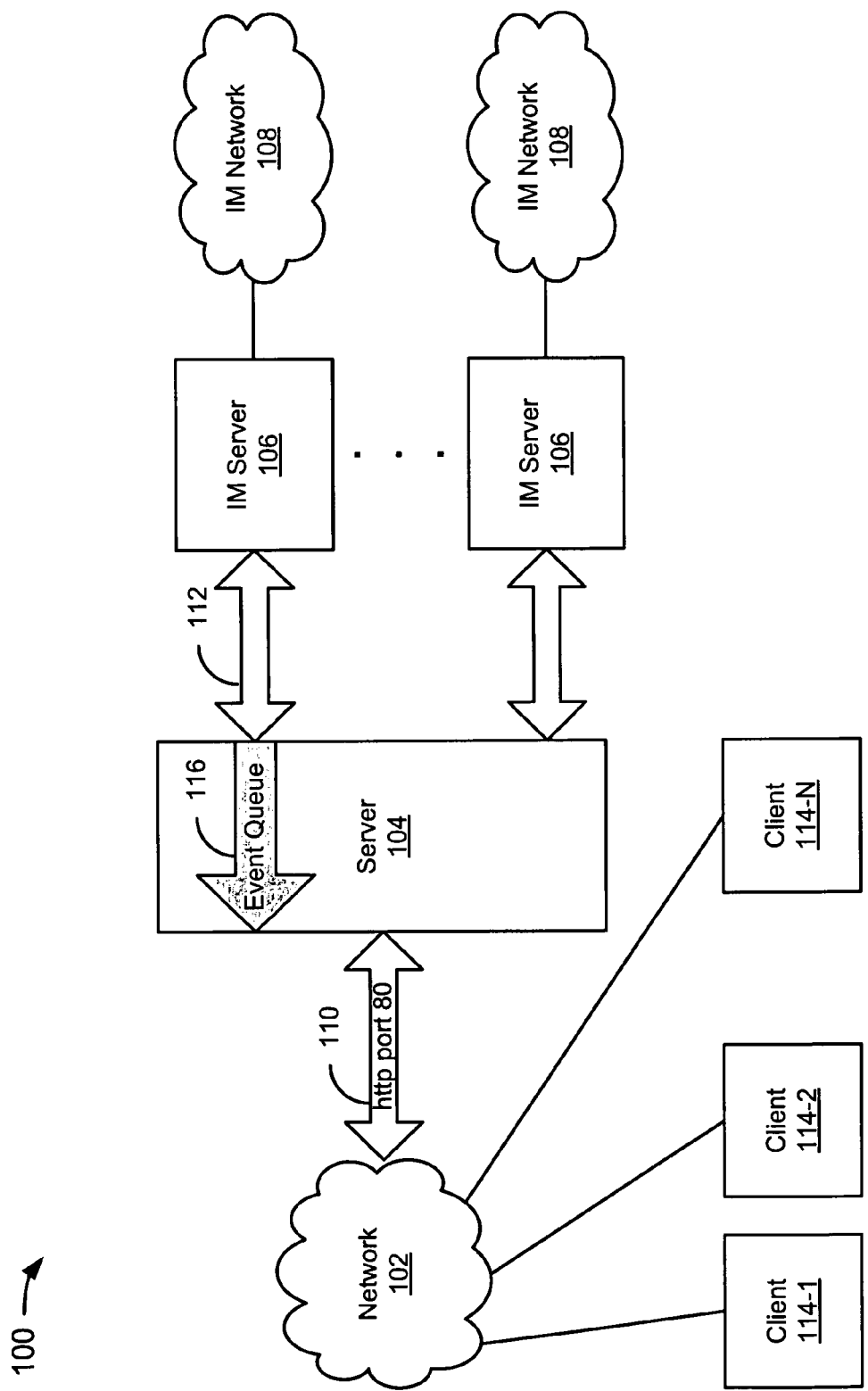
FIG. 1 depicts an example of a system for providing instant messages to clients via a web interface.

FIG. 1 depicts an example of a system 100 for providing instant messages to clients via a web interface. In the example of FIG. 1, the system 100 includes a network 102, a server 104, and an Instant Messenger (IM) server 106, and an IM network 108. The server 104 is coupled to the network at least by way of port 80. The two way communication via port 80 is represented in the example of FIG. 1 as an arrow 110. The server 104 is coupled to the IM server 106 via one or more other ports. The two way communication via the other ports is represented in the example of FIG. 1 as an arrow 112. The IM server 106 is coupled to the IM network 108 via any known or convenient mechanism. Indeed, the IM server 106 may be thought of as part of the IM network 108. The network 102 couples a plurality of clients 114-1 to 114-N (referred to collectively as clients 114) to the server 104. In the example of FIG. 1, the server 104 includes an event queue 116.

The network 102 may include by way of example but not limitation LAN, WAN, VLAN, WLAN, Internet, cellular network, phone network, radio network, or some other known or convenient network. The term "Internet" as used herein refers to a network of networks that uses certain protocols, such as TCP/IP, and possibly other protocols such as the hypertext transfer protocol (HTTP) for hypertext markup language (HTML) documents that make up the World Wide Web (the web). The physical connections of the Internet and the protocols and communication procedures are well known, but any convenient physical connections or protocols could be used.

The server 104 may include a multiple servers. Indeed, it may be desirable, depending upon details of a particular implementation, to install several servers to cope with the number of simultaneous users the system 100 supports. It may further be desirable, depending upon details of a particular implementation, for the server 104 to have a high CPU throughput, together with large amounts of RAM, to handle a large number of users. It may further be desirable, depending upon details of a particular implementation, to accomplish resource sharing via thread handling where a pool of threads is shared and used by one or more of the clients 114 for client-server communication and between the server 104 and the IM server 106.

The server 104 may include one or more of an application server, database server, web server, banners server, and content server, or any combination thereof. To make the most of the techniques described herein, the server 104 should, though is not required to, include at least one application server. The other servers can have supporting roles in, by way of example but not limitation, serving static content or advertising (e.g., banners), storing usage data, or fulfilling some other known or convenient function.

The server 104 may act as a proxy server between the clients 114 and the IM server 106. The server 104 receives communications from the clients 114 on http port 80, and responds to the clients 114 on http port 80. Communications from the clients 114 that are bound for the IM network 108, however, must also come through http port 80 to the server 104, and are then forwarded to the IM server 106. In this way, the server 104 acts as a carrier of the data from users to the IM network 108 using a mechanism that controls and manages the data (e.g., text messages, display images, emotions, audio/video streams, etc.) sent between one of the clients 114 and the server 104, and vice versa.

The IM server 106 may be any known or convenient IM server that is compatible with IM. Events, messages, or other appropriate data from the IM server 106 are collected in the event queue 116 of the server 104. The events may be collected in association with a variety of protocols including by way of example but not limitation port 1863, port 5050, port 5222, port 5190, etc.

The IM network 108 may include one or a combination of networks selected from MSN Messenger, Yahoo! Messenger, AIM AOL, ICQ, QQ, Jabber, Google Talk, IRC, or some other known or convenient IM network.

The clients 114 may include any known or convenient device, including by way of example but not limitation, a Web browser, mobile client, PDA, game console, TV box, native application, etc. The clients poll the server 104 for events. The events can be removed from the event queue 116 and translated into text, JavaScript, XML, or some other known or convenient format that one or more of the clients 114 need or expect in order to process data associated with the event.

To interact with the IM network 108, the clients 114 send data to the server 104. The data, which may include commands, is processed and translated into corresponding data that will be sent to the appropriate IM network. In an embodiment, the appropriate IM network may be determinable based upon the protocol encoded in a message.

Messages or actions from the clients 114 are collected over network protocols such as, by way of example but not limitation, HTTP or plain socket connections. The messages or actions are transformed to an appropriate protocol format to be sent over a compliant port from the clients 114 to the server 104, with the IM protocol on the application side. In a non-limiting embodiment, the compliant port is http port 80. However, any port having similar characteristics to those of a typical port 80 could be used.

The latest available browsers, as of December 2005, enable the use of a technique called AJAX (Asynchronous JavaScript And XML). With AJAX, appropriately configured clients 114 can execute actions and poll for messages or events using only JavaScript. The method is based on using an XMLHttpRequest object to make HTTP requests to the server 104. The server 104 may reply with messages taken from the queue of the corresponding session in XML (or another) format that are parsed and displayed according to the message content.

For clients 114 that include a browser, when accessing the server 104 the browser typically uses hidden HTML frames to update information on visible frames. The visible frames display appropriate information while the hidden frames are reloaded in short periods of time. In each refresh that hits the server 104, the browser identifies the current messaging session and checks if new events or messages associated with the session are in the event queue 116. When new information arrives and needs to be displayed in some form, the browser makes use of, for example, JavaScript code to update the visible frames and windows with new messages or events keeping the information up to date in the screen. In this way, automatic refreshing can take place in a hidden frame.

In another embodiment, certain of the clients 114 with browsers may not make use of refreshes. For example, a form of updating the screen without using a refresh technique is to keep one single HTTP socket request alive for the whole period of a messaging session without actually closing the socket connection. In this example, information is initially loaded and displayed in one single visible frame. While events and messages are being received by the server 104, JavaScript code can be injected into the HTML document through the same HTTP socket kept alive and managed by the server 104. For each event or message, the browser can interpret the JavaScript code injected and the corresponding parts of the HTML document and windows will be updated.

In another embodiment, certain of the clients 114 with browsers may make use of manual refreshes. Some relatively unsophisticated browsers, such as WAP and XHTML browsers often available on mobile phones, do not support hidden frames and/or JavaScript (and others may be configured such that they do not support hidden frames and/or JavaScript). In such cases, the information displayed has to be updated manually by the user. Manual updating enables any mobile phone, PDA, TV Set or any device with a browser to connect to the server 104 and use the messaging platforms made available by the server 104 assuring the communication between the clients 114 and the IM server 106.

Message history can be stored by most IM clients on a local computer. For alternative web and mobile-based clients local storage may not be possible. In a non-limiting embodiment, the server 104, may have the capability to store message history from IM conversations done via one or more of the clients 114. The message history can be accessed and searched at any time via the server 104 by one or more of the clients 114

Figure 2:
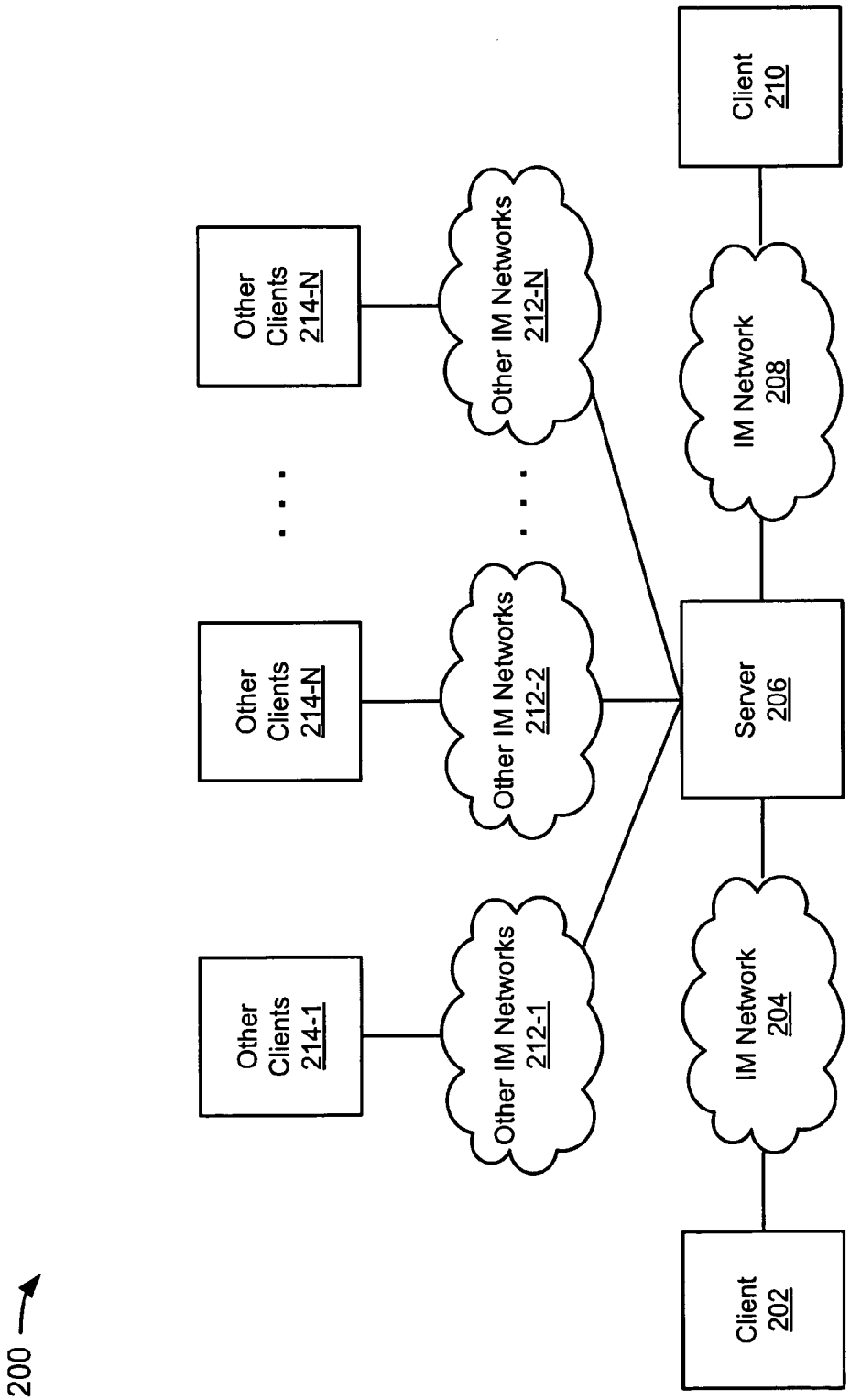
FIG. 2 depicts an example of a system for displaying content from an IM client at an alternative IM client.

FIG. 2 depicts an example of a system 200 for displaying content from an IM client at an alternative IM client. In the example of FIG. 2, the system 200 includes a client 202, an IM network 204, a server 206, an IM network 208, a client 210, other IM networks 212-1 to 212-N (referred to collectively as other IM networks 212), and other clients 214-1 to 214-N (referred to collectively as other clients 214).

For illustrative purposes, it is assumed that the client 202 has content that is compatible with the IM network 204. However, the client 210 is capable of reading content formatted to be compatible with the IM network 208. Thus, in operation, the server 206 collects content from the client 202 (either through the IM network 204, as shown in FIG. 2, or directly from the client 202, such as is shown by way of example in FIG. 1). The server 206 then formats the content as appropriate for use on the IM network 208. Once the content is properly formatted, it can be made available to the client 210 (either through the IM network 208, as shown in FIG. 2, or directly to the client 210, such as is shown by way of example in FIG. 1). Depending upon the embodiment and/or implementation, the content may also be formatted as appropriate for one or more of the other IM networks 212, to be made available for one or more of the other clients 214.

In an embodiment, the server 206 can save the content in one or many formats. In this way, the client 202 could make content available in a first IM format, the server 206 could convert the content into a second IM format, and the server 206 can save the content in at least the second IM format. Thus, the client 210 could receive the data in the second IM format. The server 206 could easily store the content in the first IM format, as well, and make the content available to other clients coupled to the IM network 204. In addition, the server 206 could convert the content to other IM formats, such as those formats that are associated with the other IM networks 212, and save the other IM formats. In this way, the other clients 214 may have access to the content.

The capability of the server 206 to store content in a particular format can be particularly advantageous in specific cases. For example, standard emotions can be identified by a character sequence, but custom emotions are stored locally at the client 202. The image of the custom emoticon has to be sent from the client 202 to the client 210 and stored locally at the client 210. However, in some cases, the client 210 is unable to store locally (or the custom emotions may be unreadable at the client 210), so the custom emotions have to be made available via the server 206. The server 206 may therefore be responsible for transferring custom emotions between the clients and making them available via web server, if applicable. In this way, the system 200 can facilitate sending and receiving custom emotions.

Figure 3:
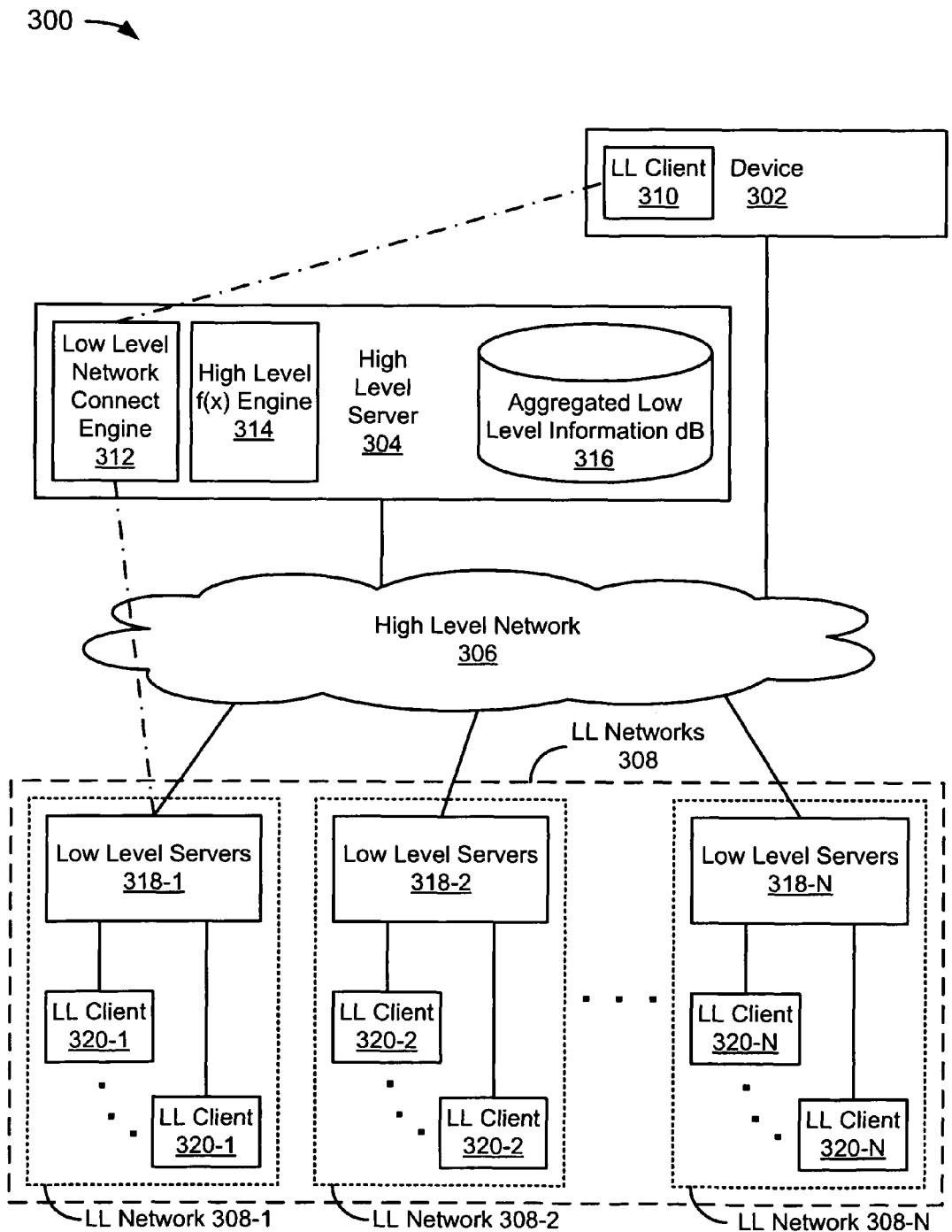
FIG. 3 depicts an example of a high level system overlaying a plurality of low level networks.

FIG. 3 depicts an example of a high level system overlaying a plurality of low level networks. In the example of FIG. 3, the system 300 includes a device 302, a high level server 304, a high level network 306, and low level networks 308.

A low level network includes a proprietary and/or limiting protocol and requires that users login to obtain full low level functionality. For example, most IM networks are low level networks that require users sign up for an account. The users are then limited to specific functionality (e.g., a limited number of emotions can be used, an avatar cannot be animated or changing, etc.) Different low level networks will have different limitations. Typically, low level clients are capable of connecting to a first low level network, but not to a second low level network.

As used herein, the term "high level network" indicates a network that can add functionality, over and above that of specific low level networks. The term "high level" is a relative term that is meaningless if no low level networks are available with which to compare. For example, a high level client may be able to use an animated avatar, while a low level client could not. Of course, a high level client who is operationally connected to a low level networks through a high level server may not be able to make full use of the high level functionality.

In the example of FIG. 3, the device 302 includes a low level client 310 embodied in a computer readable medium. The device 302 may include practically any device capable of communicating with the high level server 304. Some examples include desktop computers, laptop computers, pdas, mobile phones, smart phones, or any other applicable known or convenient device capable of connecting to, for example, the Internet.

In an alternative, the device 302 does not include the low level client 310, but rather the low level client is located elsewhere (e.g., on the high level server 304). In this alternative, the device 302 may not, for example, even be capable of supporting a low level client 310 for a particular low level network, or, as another example, the system 300 may simply be implemented such that the low level client 310 is stored elsewhere, or, as another example, user configurations may be such that the low level client 310 is stored elsewhere.

In the example of FIG. 3, the high level server 304 includes a low level network connect engine 312, a high level function engine 314, and an aggregated low level information database 316. The low level network connect engine 312 may access a user database (not shown) to determine how to connect to a particular low level network. The user database may include a user name associated with the low level network and/or a password associated with the user name (though for security purposes, a user of the device 302 may be queried for the password each time a connection is desired). The low level network connect engine 312 may use any known or convenient procedures, data, or technology to connect the low level client 310, through the high level server 304 to the appropriate one of the low level networks 308. Moreover, the low level network connect engine 312 may perform a low level to protocol to internal protocol conversion and an internal protocol to low level protocol conversion (where the low level protocol may be any of the protocols associated with the various low level networks).

The high level function engine 314 can provide the device 302 with a variety of features that would normally be unavailable on one or more of the low level networks 308. For example, the high level function engine 314 may facilitate functionality described, by way of example but not limitation, in U.S. patent application Ser. Nos. 11/637,268, 11/637,964, 11/367,514, 11/637,316, which are identified in the cross-reference to related applications section above, and incorporated by reference. Other high level functions that may be provided for a low level client over an above what would normally be possible for a low level client operating in accordance with one of the low level protocols include: Location-based services (e.g., a program that enables sorting of contacts based upon location), a picture carousel, file storage, online chat log history, file transfer functionality, video streaming, webcam, music sharing (among buddies), dating assistance, social networking assistance, bots (e.g., automatic buddies, information bots, etc.), search, blog, multi-player gaming, gambling, trading, encryption, to name several.

The aggregated low level information database 316, which is embodied in a computer readable medium at the high level server 304, includes an implementation-specific amount of information. By way of example but not limitation, the aggregated low level information database may include pictures (e.g., avatars, emotions, or other images) in a web server for exclusive or non-exclusive use by the low level client 310, an aggregated message history log for the low level client 310, event notification parameters for provisioning to the device 302, aggregated low level contact lists, user credentials that enable login to the various low level networks. Advantageously, the data can be made available online to a client that is using a browser.

To implement location-based functionality, the aggregated low level information database 316 may include a location field associated with contacts of a contacts list. The high level function engine 314 may make use of the location field with, by way of example but not limitation, a location-based sorting module that can be used to sort the contacts list by location. The location field may be filled using static data (such as, by way of example but not limitation, a home address, a work address during work hours, a vacation address from a calendar entry, or dynamically detected location).

In the example of FIG. 3, the high level network 306 couples the device 302 to the high level server 304, and couples the high level server 304 to the low level servers 308. The high level network 306 may include the low level networks 306, the Internet, the World Wide Web (WWW), and/or other networks.

In the example of FIG. 3, the low level networks 308 include low level networks 308-1 to 308-N. The low level networks 308 respectively include low level servers 318-1 to 318-N (referred to collectively as low level servers 318). The low level networks 308 respectively include low level clients 320-1 to 320-N (referred to collectively as low level clients 320). The low level clients 320 are coupled to the low level servers in a manner that is known or convenient. The low level clients 320 may be coupled to the low level servers 318 through the Internet, a cellular network, or some other network. The network through which the low level clients 320 connect to the low level servers 320 may or may not include some of the high level network 306.

In the example of FIG. 3, the low level client 310 on the device 302 is coupled to the low level network connect engine 312, which is turn coupled to (in an embodiment, one of) the low level servers 318-1. This connection facilitates communication between the low level client 310 and one or more of the low level clients 320.

Figure 4:
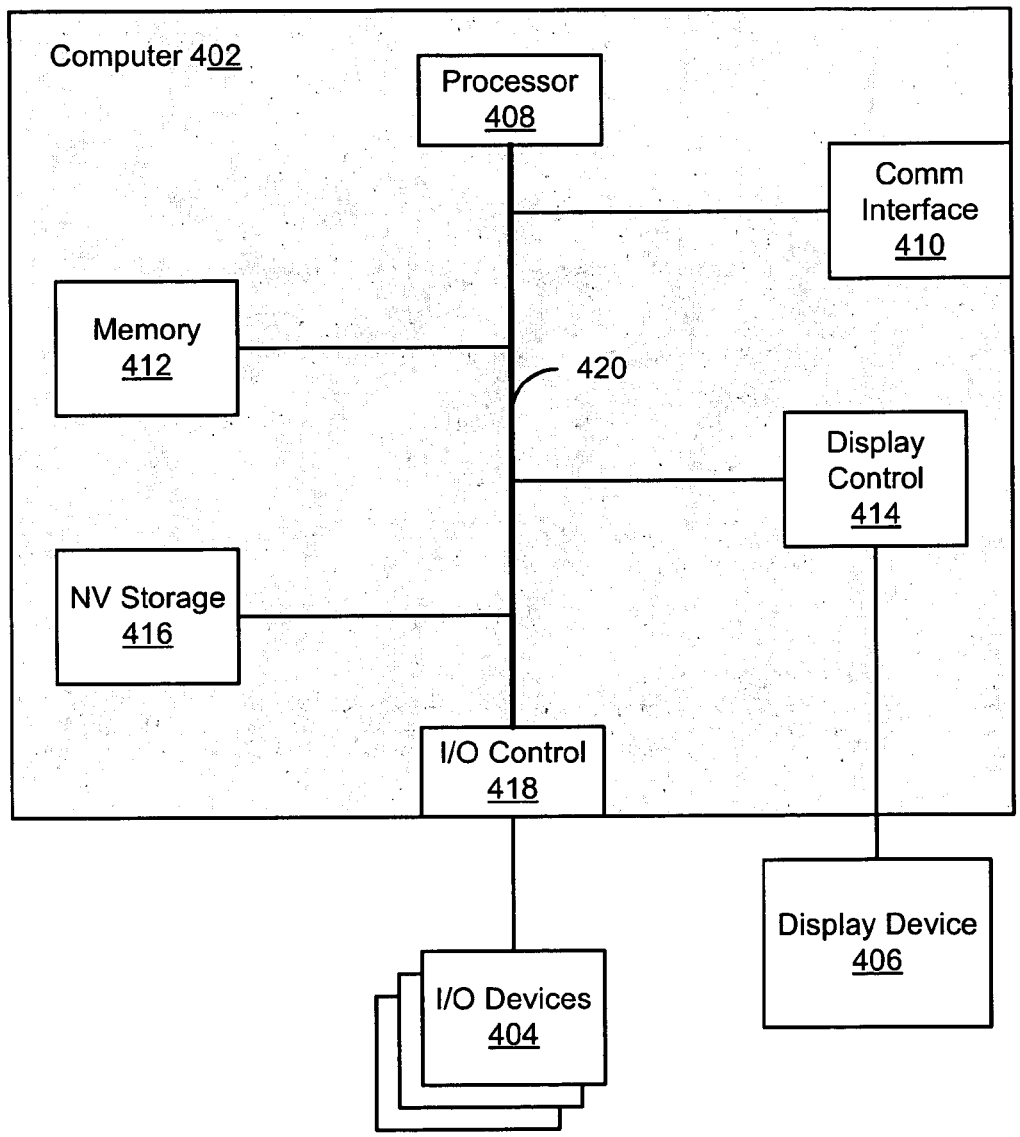
FIG. 4 depicts a computer system suitable for implementation of the techniques described above with reference to FIGS. 1-3.

FIG. 4 depicts a computer system 400 suitable for implementation of the techniques described above with reference to FIGS. 1-3. The computer system 400 includes a computer 402, I/O devices 404, and a display device 406. The computer 402 includes a processor 408, a communications interface 410, memory 412, display controller 414, non-volatile storage 416, and I/O controller 418. The computer 402 may be coupled to or include the I/O devices 404 and display device 406.

The computer 402 interfaces to external systems through the communications interface 410, which may include a modem or network interface. The communications interface 410 can be considered to be part of the computer system 400 or a part of the computer 402. The communications interface 410 can be an analog modem, ISDN modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 410 optional in the strictest sense of the word.

The processor 408 may include, by way of example but not limitation, a conventional microprocessor such as an Intel Pentium microprocessor or Motorola power PC microprocessor. While the processor 408 is a critical component of all conventional computers, any applicable known or convenient processor could be used for the purposes of implementing the techniques described herein. The memory 412 is coupled to the processor 408 by a bus 420. The memory 412, which may be referred to as "primary memory," can include Dynamic Random Access Memory (DRAM) and can also include Static RAM (SRAM). The bus 220 couples the processor 408 to the memory 412, and also to the non-volatile storage 416, to the display controller 414, and to the I/O controller 418.

The I/O devices 404 can include a keyboard, disk drives, printers, a scanner, and other input and output devices, including a mouse or other pointing device. For illustrative purposes, at least one of the I/O devices is assumed to be a block-based media device, such as a DVD player. The display controller 414 may control, in a known or convenient manner, a display on the display device 406, which can be, for example, a cathode ray tube (CRT) or liquid crystal display (LCD).

The display controller 414 and I/O controller 418 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 416, which may be referred to as "secondary memory," is often a magnetic hard disk, an optical disk, or another form of storage for large amounts of data. Some of this data is often written, by a direct memory access process, into memory 412 during execution of software in the computer 402. The non-volatile storage 416 may include a block-based media device. The terms "machine-readable medium" or "computer-readable medium" include any known or convenient storage device that is accessible by the processor 408 and also encompasses a carrier wave that encodes a data signal.

The computer system 400 is one example of many possible computer systems which have different architectures. For example, personal computers based on an Intel microprocessor often have multiple buses, one of which can be an I/O bus for the peripherals and one that directly connects the processor 408 and the memory 412 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 412 for execution by the processor 408. A Web TV system, which is known in the art, is also considered to be a computer system, but it may lack some of the features shown in FIG. 4, such as certain input or output devices. A typical computer system will usually include at least a processor, memory, and a bus coupling the memory to the processor.

The computer system 400 may be controlled by an operating system (OS). An OS is a software program—used on most, but not all, computer systems—that manages the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Linux, and Mac OS®). Delineating between the OS and application software is sometimes rather difficult. Fortunately, delineation is not necessary to understand the techniques described herein, since any reasonable delineation should suffice.

The lowest level of an OS may be its kernel. The kernel is typically the first layer of software loaded into memory when a system boots or starts up. The kernel provides access to various common core services to other system and application programs.

As used herein, algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture.

Figure 5:
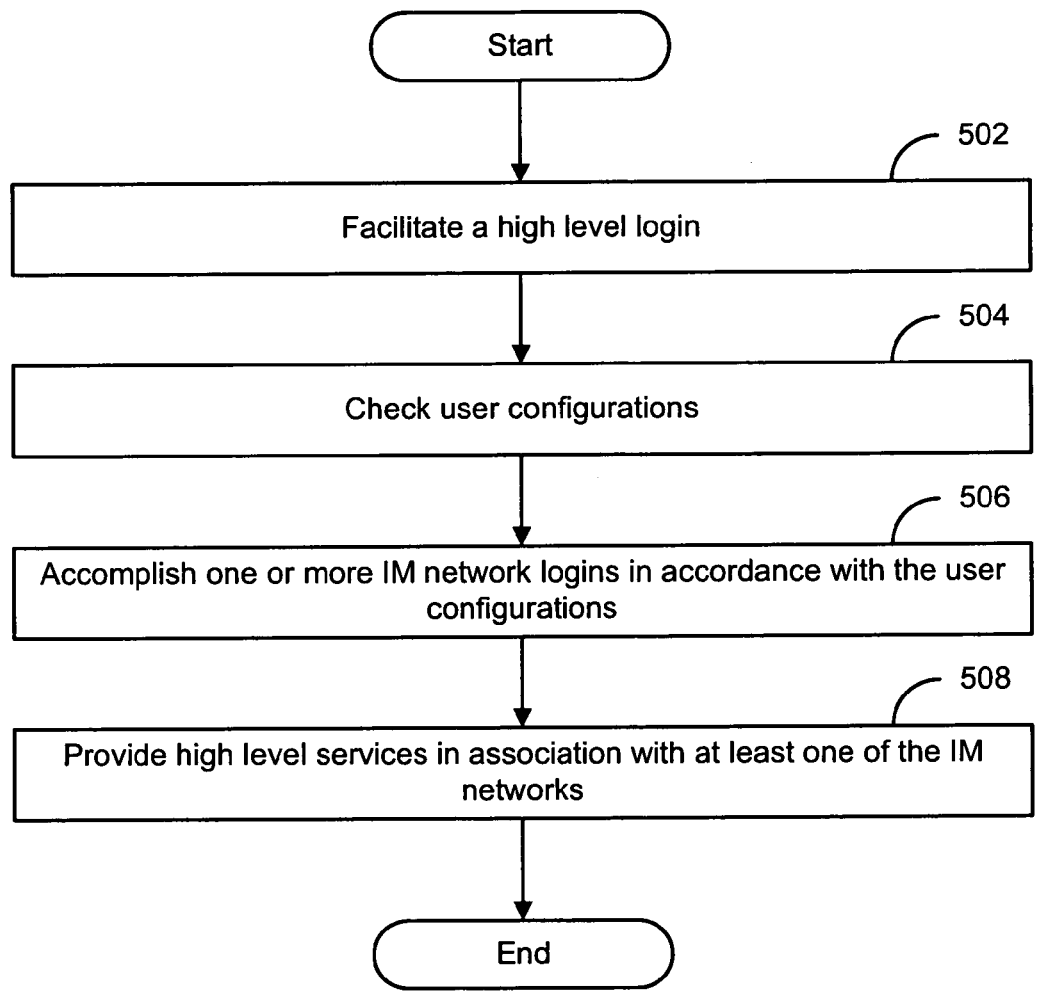
FIG. 5 depicts a flowchart of an example of a method for providing high level functionality to a low level client.

FIG. 5 depicts a flowchart 500 of an example of a method for providing high level functionality to a low level client. This method and other methods are depicted as serially arranged modules. However, modules of the methods may be reordered, or arranged for parallel execution as appropriate.

In the example of FIG. 5, the flowchart 500 starts at module 502 where a high level login is facilitated. The high level login may be between, for example, a high level server and a high level client. Alternatively, the high level login may be facilitated between a low level client and a high level server, where the high level server includes data associated with the low level client that corresponds to a high level account.

In the example of FIG. 5, the flowchart 500 continues to module 504 where user configurations are checked. User configurations may include such things as which IM network logins should be accomplished when the high level login is accomplished (including data sufficient to accomplish the logins).

In the example of FIG. 5, the flowchart 500 continues to module 506 where one or more IM network logins are accomplished in accordance with the user configurations. A high level platform may or may not include all of the information necessary to accomplish the login. For example, the platform may prompt a user for a password in each case.

In the example of FIG. 5, the flowchart 500 continues to module 508 where high level services are provided in association with at least one of the IM networks. Some examples of these types of services were described previously.

Figure 6:
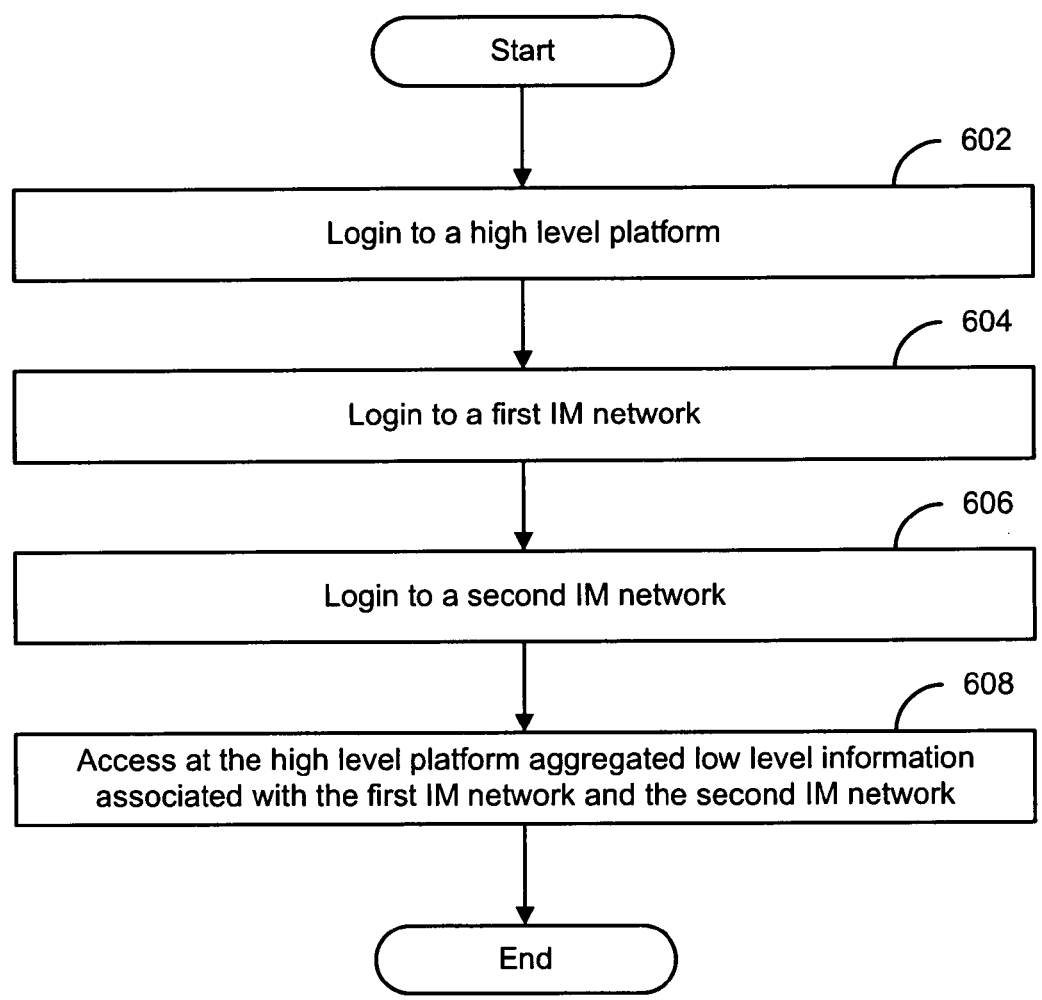
FIG. 6 depicts a flowchart 600 of an example of a method for providing aggregated 1M information at a high level platform to an 1M client.

FIG. 6 depicts a flowchart 600 of an example of a method for providing aggregated IM information at a high level platform to an IM client. In the example of FIG. 6, the flowchart 600 starts at module 602 where a high level platform login is accomplished. The flowchart 600 continues to module 604 where a first IM network login is accomplished and to module 606 where a second IM network login is accomplished. The flowchart 600 continues to module 600 where aggregated low level information associated with the first IM network and the second IM network are accessed at the high level platform.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A system comprising:
    a low level network connect engine for coupling a low level client to a low level server;
    an aggregated low level information database that includes data associated with the low level client, wherein the aggregated low level information database includes data associated with at least two low level networks;
    a high level function engine for providing functionality to the low level client not normally available to low level clients of the low level server, and for making information from the aggregated low level information database at least available online, wherein, in operation, a low level client is first coupled to the high level function engine and then the low level network connect engine couples the low level client to the low level server.

2. The system of claim 1, wherein the low level network connect engine includes a protocol conversion module for converting from a low level protocol to a high level protocol.

3. The system of claim 1, wherein the low level network connect engine includes a protocol conversion module for converting from a high level protocol to a low level protocol.

4. The system of claim 1, wherein the aggregated low level information database includes stored images, and wherein the high level function engine provides the images in association with messages from the low level client to the low level server.

5. The system of claim 1, wherein the low level network connect engine monitors traffic from the low level client to the low level server and stores a log in the aggregated low level information database.

6. The system of claim 1, wherein the high level function engine provides event notifications to the low level client in response to high level or low level events.

7. The system of claim 1, wherein the aggregated low level information database includes, at least while the low level client is coupled to the low level network through the low level connect engine, an aggregated contact list that includes contacts associated with the low level client and the low level network.

8. The system of claim 1, wherein the aggregated low level information database includes location-based fields associated with contacts of a contacts list.

9. The system of claim 8, wherein the contacts list is remotely maintained.

10. The system of claim 8, wherein the high level function engine includes a location-based sorting module, wherein, in operation, the high level function engine uses the location-based sorting module to facilitate sorting of the contacts list based upon location associated with the contacts.

11. A system comprising:
an instant messaging (IM) network connect engine for coupling an IM client to an IM server;
an aggregated IM network information database that includes data associated with the IM client, wherein the aggregated IM network information database includes data associated with at least two IM networks;
a high level function engine for providing functionality to the IM client not normally available to IM clients of the IM server, and for making information from the aggregated IM network information database at least available online,
wherein, in operation, an IM client is first coupled to the high level function engine and then the IM network connect engine couples the IM client to the IM server.

12. The system of claim 1, wherein the IM network connect engine includes a protocol conversion module for converting from an IM protocol to a high level protocol.

13. The system of claim 1, wherein the IM network connect engine includes a protocol conversion module for converting from a high level protocol to an IM protocol.

14. The system of claim 1, wherein the aggregated IM network information database includes stored images, and wherein the high level function engine provides the images in association with messages from the IM client to the IM server.

15. The system of claim 1, wherein the IM network connect engine monitors traffic from the IM client to the IM server and stores a log in the aggregated IM network information database.

16. The system of claim 1, wherein the high level function engine provides event notifications to the IM client in response to high level or IM network events.

17. The system of claim 1, wherein the aggregated IM network information database includes, at least while the IM client is coupled to the IM network through the IM connect engine, an aggregated contact list that includes contacts associated with the IM client and the IM network.

18. The system of claim 1, wherein the aggregated IM network information database includes location-based fields associated with contacts of a contacts list.

19. A high level server comprising:
a high level function engine;
an aggregated low level information database coupled to the high level function engine, wherein, in operation, the aggregated low level information includes data associated with a first low level network and a second low level network;
a low level network connect engine coupled to the high level function engine;
wherein, in operation, the low level network connect engine couples a low level client to a low level server on the first low level network; the high level function engine provides data stored in the aggregated low level information database that is associated with the second low level network to the low level client.

20. The high level server of claim 19, wherein the first low level network and the second low level network are instant messaging networks.

* * * * *